United States Patent [19]

Kato

[11] Patent Number: 5,978,557
[45] Date of Patent: *Nov. 2, 1999

[54] PRINTING DEVICE CONTROL APPARATUS AND METHOD

[75] Inventor: Takao Kato, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/829,833

[22] Filed: Mar. 25, 1997

[30] Foreign Application Priority Data

Mar. 27, 1996 [JP] Japan ................................ 8-072362

[51] Int. Cl.⁶ .................................................. G06F 15/00
[52] U.S. Cl. ............................ 395/114; 395/112; 395/109
[58] Field of Search .................................... 395/114, 112, 395/111, 101, 110, 109, 117, 115, 116, 104, 106, 107, 108, 200.31, 500, 500.44–500.49, 828, 834, 836, 837, 838, 882, 892; 358/407, 408, 402, 467, 468, 401, 500, 501, 462, 502–503; 400/63, 83, 70–75; 347/2, 3, 5, 14; 345/431; 709/201; 710/8, 62, 14, 72, 16, 17, 18

[56] References Cited

U.S. PATENT DOCUMENTS

| 5,140,674 | 8/1992 | Anderson et al. | 395/112 |
| 5,467,434 | 11/1995 | Hower, Jr. et al. | 395/114 |
| 5,604,598 | 2/1997 | Shigemura | 358/401 |

*Primary Examiner*—Dov Popovici
*Attorney, Agent, or Firm*—Fitzpatrick, Cella, Harper & Scinto

[57] ABSTRACT

The object of the invention is to automatically select an optimum printing device according to the characteristics of a page in units of pages to print the page, thereby reducing the load on the operator in print processing. For this purpose, it is determined in units of pages whether data to be printed contains color information. If color information is present, a color flag is set to ON. When the color flag is ON, print data prepared and developed in a page buffer is sent to a color printer. When the color flag is OFF, the print data prepared and developed in the page buffer is sent to a monochromatic printer.

21 Claims, 11 Drawing Sheets

- COLOR PRINTER
  LPT1 : LOCAL (COLOR)

| DRIVER_A |

- MONOCHROMATIC PRINTER
  LPT2 : LBP OF NETWORK SERVER

| DRIVER_B |

| OK |

FIVE PAGES TO BE INSERTED TO
THIS POSITION ARE PRINTED BY
MONOCHROMATIC PRINTER

PRINTING DEVICE CONTROL APPARATUS AND METHOD

BACKGROUND OF THE INVENTION

The present invention relate to a printing device control apparatus and method and, more particularly, to an apparatus and method of controlling a plurality of printing devices.

Printing devices use various printing schemes including electrophotography (laser beam printer) and ejection of ink droplets of a printer (ink-jet printer).

Generally, a laser printer is suitable for monochromatic, i.e., black-and-white printing, and the print quality of black and white portions is high. In addition, the laser printer has a high speed. On the other hand, an ink-jet printer is suited to printing a color image, though its speed is lower than that of the laser beam printer.

When a document is to be prepared by a document processing apparatus (including a personal computer), often almost all pages are monochromatic, and only several pages require color printing.

In this case, as color page portions are present, the operator performs operations to output the entire document to a color ink-jet printer for printing, or to output only the color page portions of the document to the color ink-jet printer and thereafter print the remaining monochromatic pages with a laser beam printer dedicated to monochromatic printing.

In the former case, the operator needs to perform the operation only once because the printing operation is completed with only one printing instruction. However, with the color ink-jet printer, a long time is required to complete printing of all pages.

In the latter case, if the apparatus itself has only one printer interface, switching connection of the two printers is necessary, and the printing instruction must be given at least twice. Even if the apparatus has two printer interfaces, the printing instructions must still be given at least twice. This also applies to a case in which the printers are connected to a network, and the color ink-jet printer and monochromatic laser beam printer on the network (or one of the printers is a local printer) perform print processing.

SUMMARY OF THE INVENTION

The present invention has been made in consideration of the above problem, and has as its object to provide a print control apparatus and method of automatically selecting an optimum printing device according to the characteristics of a page to be printed in units of pages to print the page, thereby reducing the load on the operator in print processing.

To achieve the above object, according to the present invention, there is provided a print control apparatus for performing distributed printing using a plurality of printing devices having different printing characteristics, comprising:

determination means for receiving data to be printed from host processing and determining characteristics of the data in units of pages;

selection means for selecting one of the plurality of printing devices in accordance with a determination result from the determination means; and sending means for sending data of one page determined by the determination means to the selected printing device.

According to a preferred aspect of the present invention, preferably, the apparatus further comprises first setting means for setting whether a replacement page is to be inserted, second setting means for setting a printing device for printing the replacement page, and second sending means for, when insertion of the replacement page is instructed by the first setting means, and the data of one page is to be sent to the sending means, sending data of the replacement page to the printing device set by the second setting means. With this arrangement, sorting of printouts which have been subjected to distributed printing in units of pages is facilitated.

The second sending means may send the data of one page which is sent to a printing device which is not set by the second setting means to the printing device set by the second setting means. With this arrangement, a printing device prints all pages while the other printing device prints only replacement pages. Although the output forms are different, pages to be replaced are obvious.

The second sending means may count the number of pages continuously sent to a printing device which is not set by the second setting means and send data corresponding to a count result to the printing device set by the second setting means. With this arrangement, the recording medium is not wasted.

The printing characteristic represents whether the printing device is capable of color printing, the determination means determines whether the data in units of pages contains information associated with color, and the selection means selects color printing when the information associated with color is present and monochromatic printing when no color information is present. With this arrangement, satisfactory printouts can be obtained for both monochromatic and color data at a high speed and low cost.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An embodiment of the present invention will be described below in detail with reference to the accompanying drawings.

Description of Arrangement

Figure 1:
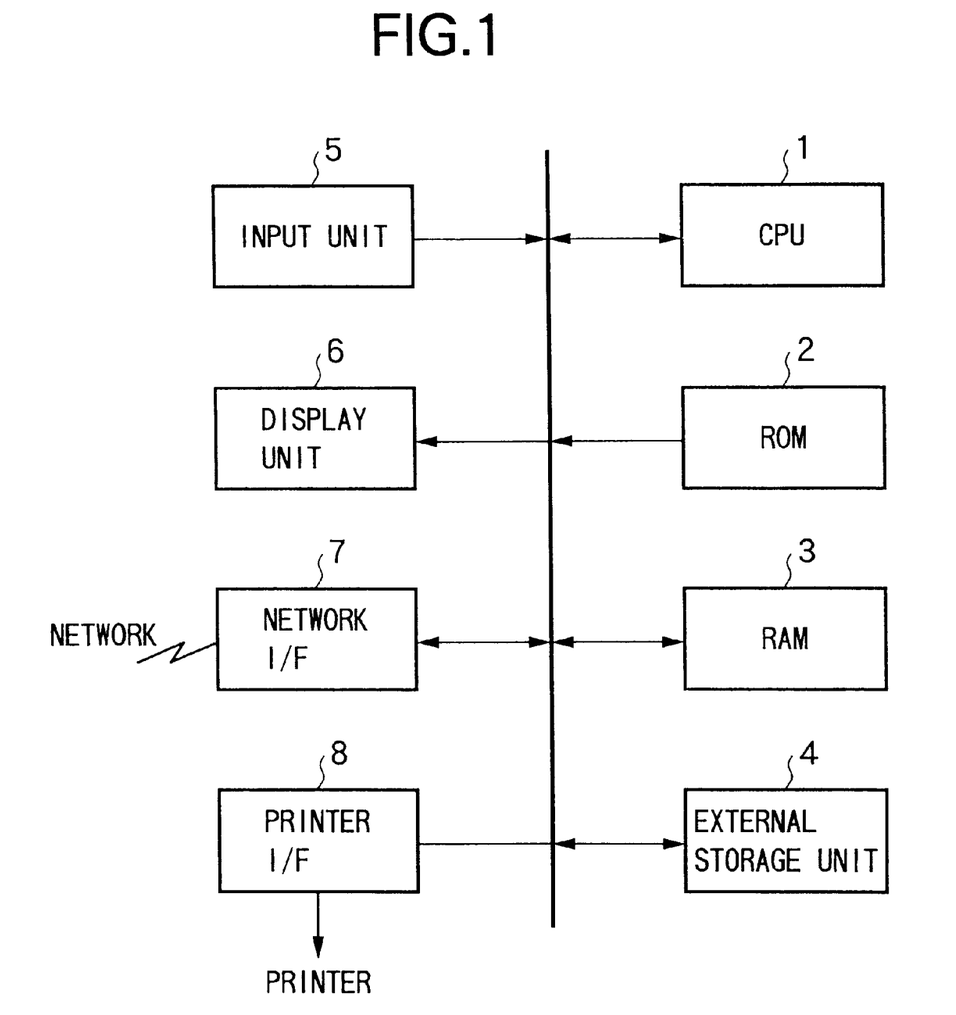
FIG. 1 is a block diagram of an information processing apparatus according to the first embodiment.
Figure 2:
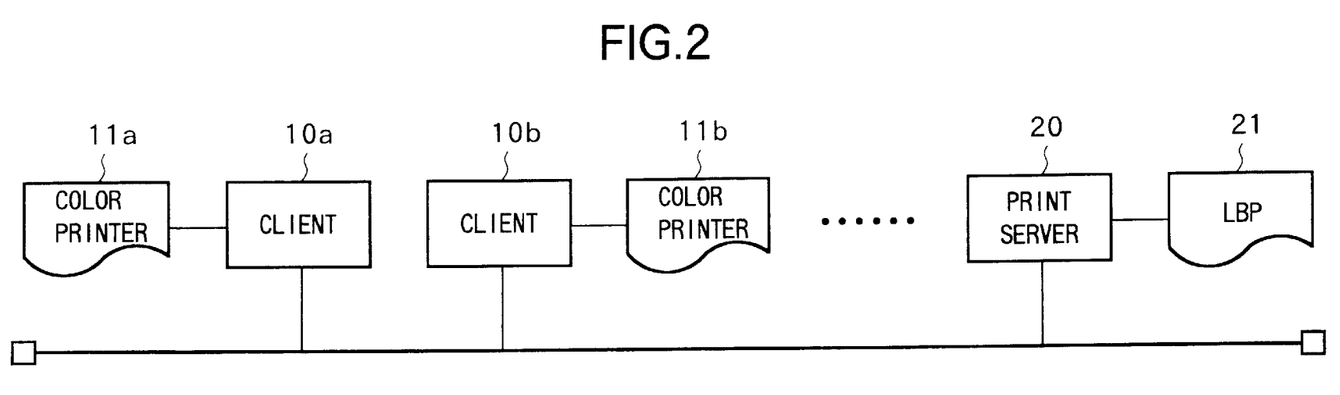
FIG. 2 is a view showing a network configuration of the first embodiment.

FIG. 1 shows the arrangement of a document processing apparatus according to the first embodiment. FIG. 2 shows the apparatus shown in FIG. 1 as one of clients on a network being connected to the network.

Referring to FIG. 1, reference numeral 1 denotes a CPU for controlling the entire operation of the apparatus; 2, a ROM which stores a boot program, a BIOS, and the like; and 3, a RAM used to serve as the work area of the CPU 1 or to develop and execute an OS (including an NOS: network OS) and a program associated with document processing. A driver program (printer driver) for printing is one of the programs developed in this RAM. The printer driver will be described later in detail.

Reference numeral 4 denotes an external storage unit such as a hard disk and stores the OS, the application program for document preparation, and the printer driver in advance.

Reference numeral 5 denotes an input unit constituted by a pointing device such as a keyboard or mouse; 6, a display unit for displaying an edit screen or the like; 7, a network interface (network I/F) for data transmission/reception with the network; and 8, a printer interface (printer I/F) for connecting the apparatus to a printer (local printer).

Referring to FIG. 2, reference numerals 10a and 10b denote client apparatuses on the network, which have the arrangement shown in FIG. 1. Reference numerals 11a and 11b denote local printers connected to the clients, respectively. A print server 20 performs processing of printing print data sent from a client with a printer 21 connected to the print server.

With the above arrangement, a color ink-jet printer as a local printer is connected to each client, and a laser beam printer dedicated to monochromatic printing and capable of high-speed printing is connected to the print server 20. As will be apparent from the following description, the present invention is not limited to this arrangement.

Figure 5:
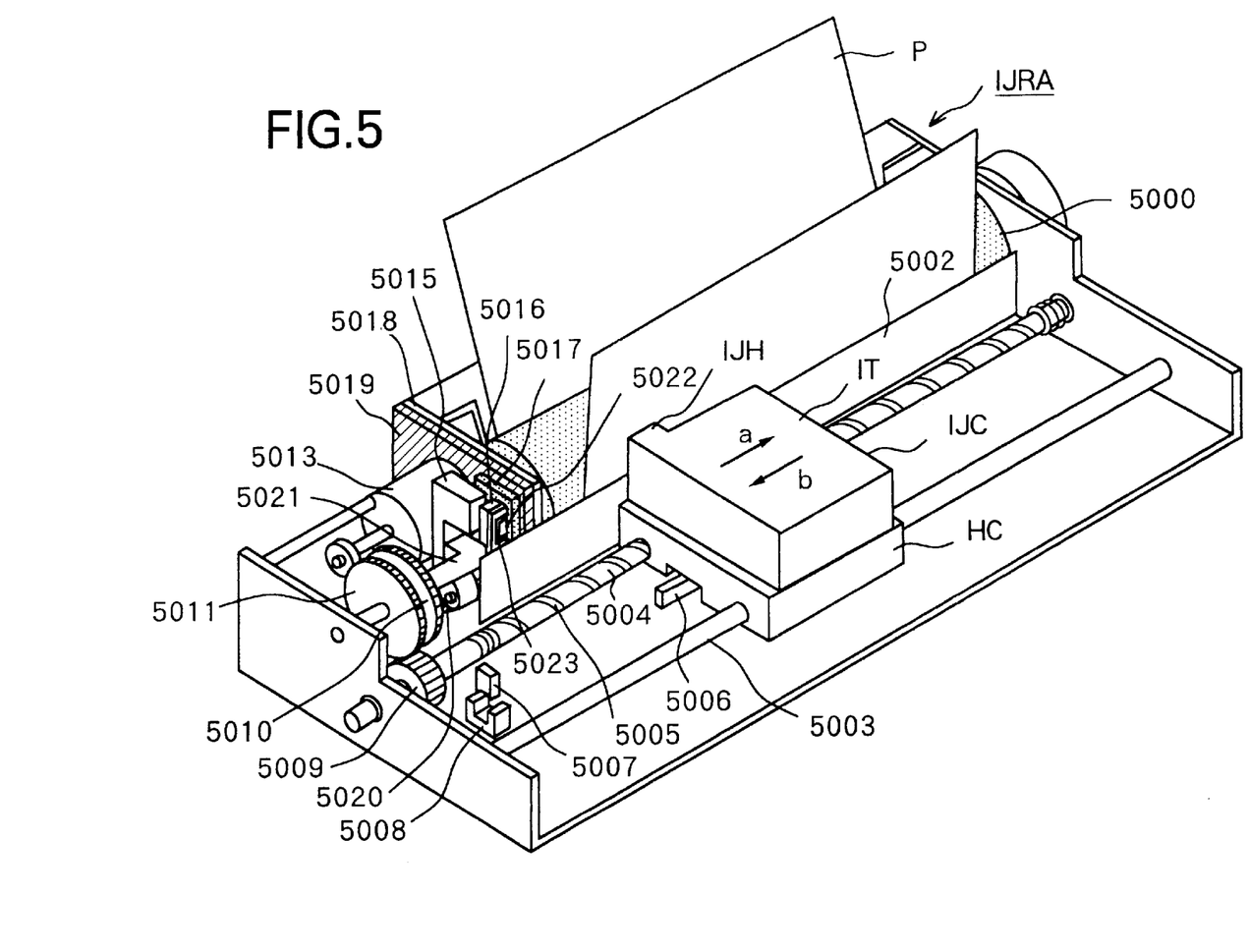
FIG. 5 is a perspective view of a color ink-jet printer of the first embodiment.

FIG. 5 is a perspective view of the color ink-jet printer (IJRA) 11a or 11b of this embodiment. Referring to FIG. 5, a carriage HC engages with a helical groove 5004 of a lead screw 5005 which rotates upon forward/reverse rotation of a drive motor 5013 through driving force transmission gears 5011 and 5009. The carriage HC has a pin (not shown) and reciprocally moves in directions indicated by arrows a and b. An ink-jet cartridge IJC for C, M, and Y components is loaded in the carriage HC. A paper press plate 5002 presses a paper sheet against a platen 5000 along the moving direction of the carriage. Photocouplers 5007 and 5008 serve as home position detection means for confirming the presence of a lever 5006 of the carriage in this region to switch the rotational direction of the drive motor 5013. Reference numeral 5016 denotes a member for supporting a cap member 5022 which covers the front surface of the print head; and 5015, a suction means for drawing the air in the cap. The suction means 5015 performs suction recovery of the print head through an opening 5023 in the cap. Reference numeral 5017 denotes a cleaning blade. A member 5019 can move this blade in the front-and-rear direction, and these members are supported by a main body support plate 5018. In place of the blade of this form, a known cleaning blade can be applied to this example, as a matter of course. Reference numeral 5021 denotes a lever for starting suction for suction recovery. The lever 5021 moves in accordance with the movement of a cam 5020 engaging with the carriage, and the transmission of the driving force from the drive motor is controlled by a known transmission means such as clutch switching.

Of these capping, cleaning, and suction recovery operations, desired processing can be performed at a corresponding position by the function of the lead screw 5005 when the carriage enters the region on the home position side.

Figure 6:
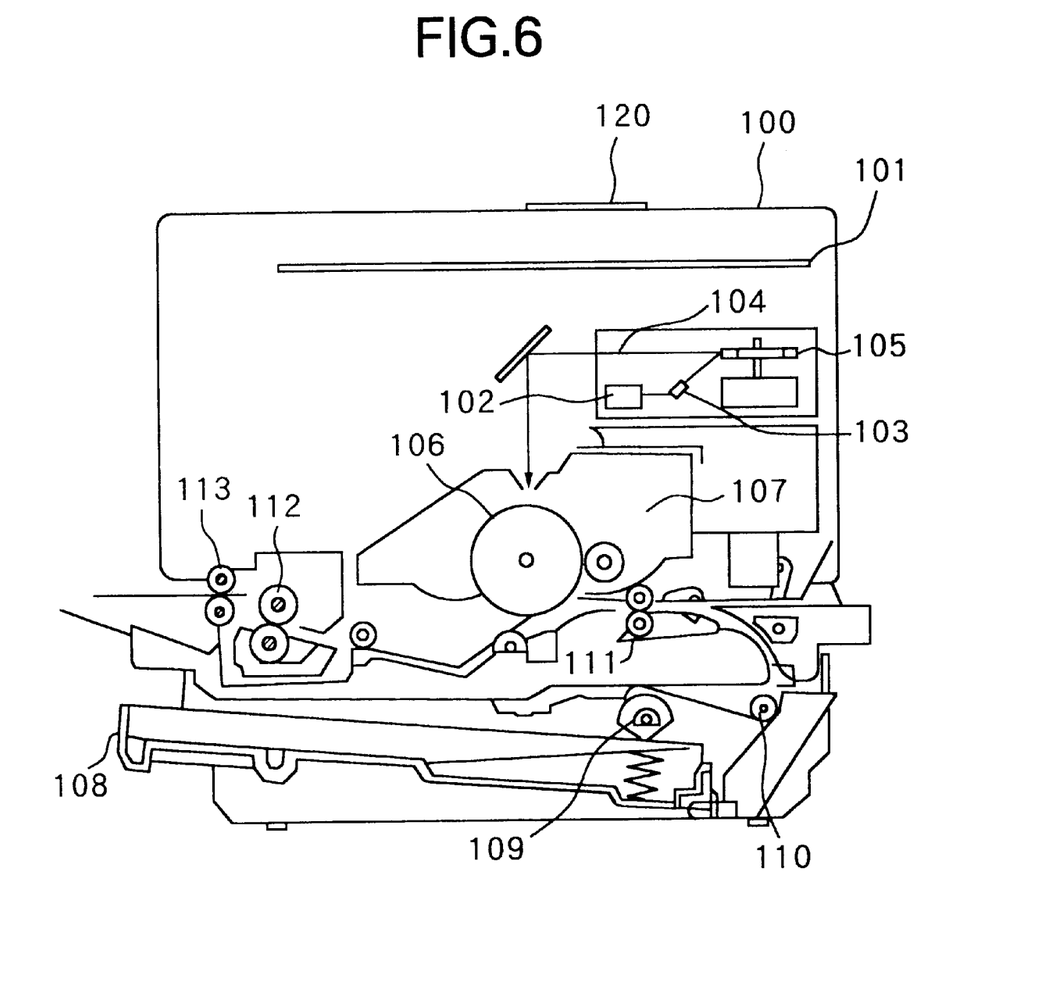
FIG. 6 is a sectional view showing the internal structure of a laser beam printer of the first embodiment.

FIG. 6 is a sectional view showing the internal structure of the laser beam printer (to be abbreviated to an LBP hereinafter) connected to the print server 20 of this embodiment. The LBP can register a character pattern or form data from the print server.

Referring to FIG. 6, an LBP main body 100 receives character information (character code), form information, or a macro command supplied from the host computer connected to the external device (the print server 20 in this embodiment) and stores the information or command, prepares a corresponding character pattern or form pattern according to the information, and forms an image on a recording paper sheet as a recording medium. Reference numeral 120 denotes an operation panel on which switches to be operated by the user and an LED display device are arranged; and 101, a printer control unit for controlling the entire operation of the LBP 100 and analyzing character pattern information supplied from the host computer. The control unit 101 mainly converts character information corresponding to a character pattern into a video signal and outputs the video signal to a laser driver 102. The laser driver 102 is a circuit for driving a semiconductor laser 103. The laser driver 102 turns on/off a laser beam 104 emitted from the semiconductor laser 103 in accordance with the input video signal. The laser beam 104 is deflected in the right-and-left direction by the side surfaces of a rotary polygonal mirror 105 which rotates at a constant speed to scan and expose an electrostatic drum 106. With this operation, an electrostatic latent image of the character pattern is formed on the electrostatic drum 106. This latent image is transferred onto a recording paper sheet after the latent image is developed by a developing unit 107 around the electrostatic drum 106 (after black toner is applied).

As the recording paper sheet, a cut sheet is used. Cut recording paper sheets are stored in a paper cassette 108 loaded in the LBP 100, fed into the apparatus by a feed roller 109 and conveyance rollers 110 and 111, and supplied to the electrostatic drum 106. The toner image formed on the electrostatic drum 106 by the developing unit 107 is transferred onto the conveyed recording paper sheet. Thereafter, the recording paper sheet is conveyed to a fixing unit 112 to fix the toner. Finally, the recording paper sheet is delivered from the apparatus by delivery rollers 113.

Description of Processing

Next, print processing on the client side in this embodiment with the above arrangement will be described. For descriptive convenience, print processing on the client 10a side will be described below.

Generally, when the client uses MS-WINDOWS of Microsoft Corporation as an OS (the OS is not limited to this, as a matter of course), print processing is performed through a common printer driver regardless of the application (word processor application or graphic processing application). The printer driver converts data transferred from the application side through the OS into a language understood by the printer and outputs the language data through the OS. This processing is performed in this embodiment as well.

In the printer driver of this embodiment, however, a window screen (not shown) for setting an environment is displayed, and the startup program defaults to color print processing by the local printer, and monochromatic print processing by the printer 21 on the network.

Upon actually receiving a printing instruction from the application, the printer driver determines whether color print processing is to be performed (whether information designating colors other than black and white or information intending a color image is included) in units of pages. If it is determined that color print processing is required, the locally connected color ink-jet printer 11a is used for printing. If it is determined that monochromatic print processing is to be performed, print data is sent to the print server 20 to cause the LBP 21 connected to the print server 20 to print.

When the client instructs printing for a document of 10 pages (the entire document does not always consist of 10 pages), and the third and fifth pages require color printing, print data of the third and fifth pages are sent to the local printer 11a, and print data of the remaining pages are sent to the server 20.

As a result, the third and fifth pages are printed and output from the local printer 11a while the remaining first, second, fourth and sixth to tenth pages are printed by the LBP 21.

Since one document is printed by two printers, the positions where the color pages are to be inserted in the monochromatic pages are clearly indicated. Sometimes the number of monochromatic pages may be smaller. Therefore, dummy pages (replacement pages) with a predetermined message indicating the insertion positions are printed on the monochromatic or color printing side.

An example in which replacement pages are inserted on the monochromatic print processing side will be described below with reference to FIG. 3.

Figure 3:
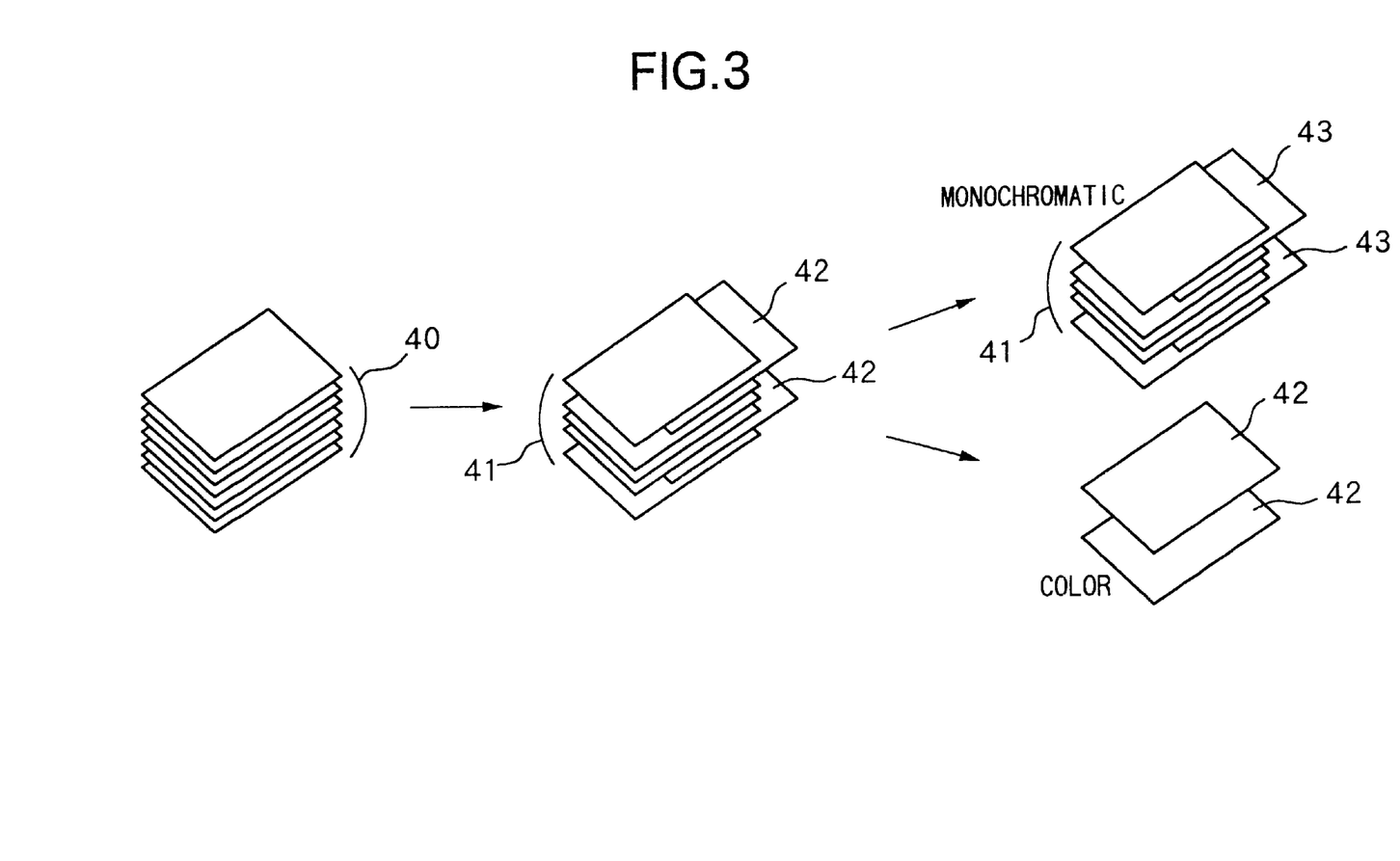
FIG. 3 is a view for explaining print processing including a color page in the first embodiment.

In FIG. 3, reference numeral 40 denotes document data to be printed. Pages 42 are color pages, and pages 41 are monochromatic. The pages 42 are printed by the local printer 11a, and the remaining pages 41 are printed by the LBP 21. In this embodiment, the LBP 21 prints dummy pages (replacement pages) 43 each with a predetermined message indicating that a color page is originally present at the page position 42.

The user can select whether to print replacement pages upon printing, as needed. With this processing, when both the numbers of monochromatic and color pages are large, the color page insertion positions are obvious. When the total number of pages is small, confusion cannot occur. This allows effective utilization of available resources.

Description of Processing Contents

Figure 4:
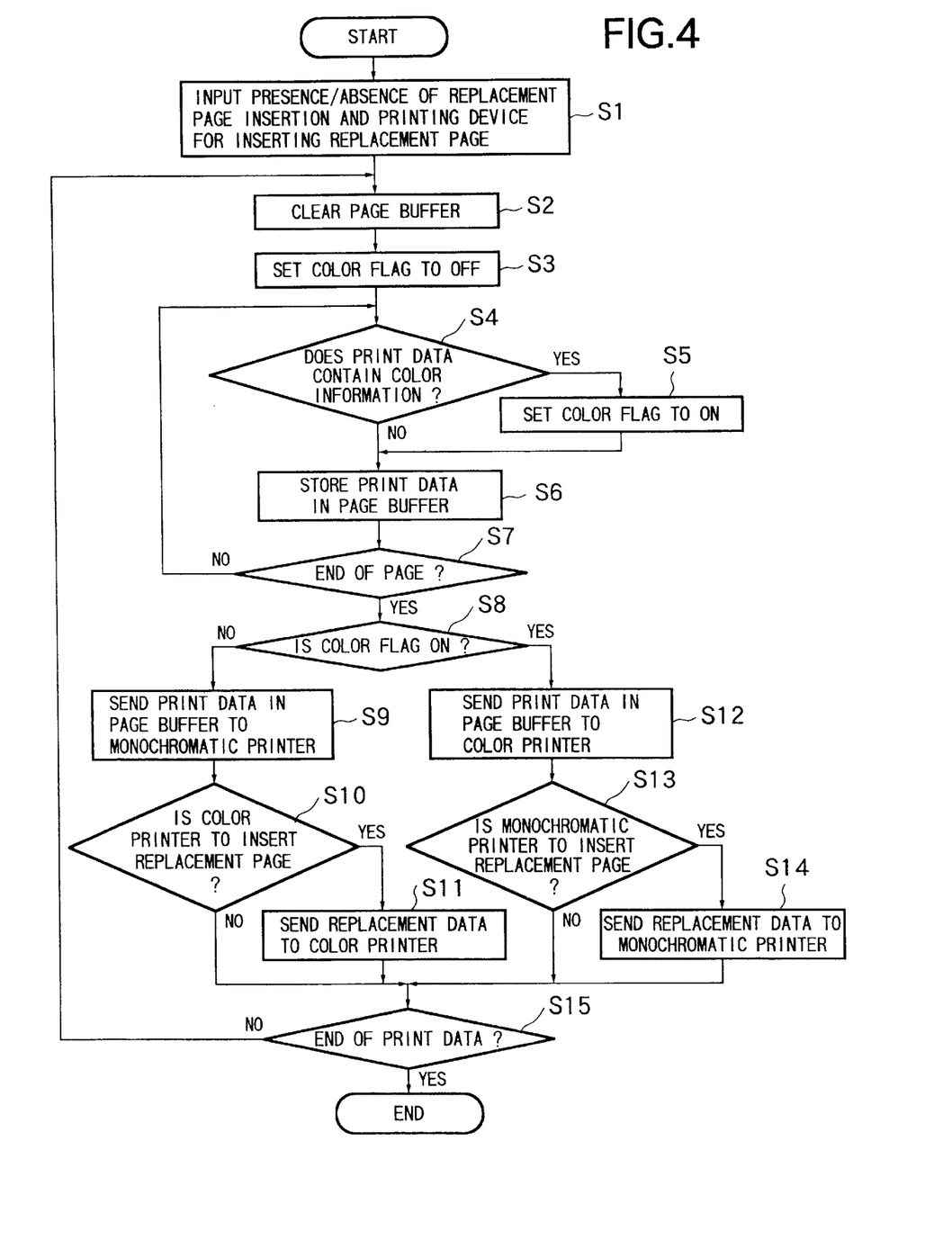
FIG. 4 is a flow chart showing the procedures of print processing of the first embodiment.

The processing contents of the printer driver of this embodiment will be described below with reference to FIG. 4. This processing starts upon receiving a printing instruction from the application.

In step S1, a predetermined menu screen is displayed on the display unit 6. Whether replacement pages are to be printed, and when replacement page print processing is set, the replacement page insertion position, i.e., the monochromatic printer or color printer is set by the user on the menu screen. Generally, monochromatic print processing is frequently performed. Therefore, a default setting is made such that a designation of replacement page print processing enables the monochromatic printer.

Next, a page buffer is ensured in the RAM 3 to prepare print data and cleared in step S2. A color flag (for storing information indicating whether the page of interest is color or monochromatic) which is ensured in advance in the RAM 3 is initialized to OFF (set for monochromatic print processing) in step S3, and the flow advances to step S4.

In step S4, data to be printed is received from the OS or application, and it is determined whether the data contains color information (information other than black and white information).

If it is determined that color information is present, the flow advances to step S5 to set the color flag to ON.

In step S6, print data based on the received data is prepared and stored in the page buffer. The processing of preparing print data is known, and a detailed description thereof will be omitted.

The above processing is repeated until it is determined in step S7 that print data for data of one page is completely prepared and stored.

Upon completion of storage of print data of one page, the flow advances to step S8 to determine the state of the color flag.

If it is determined in step S8 that the color flag is OFF (if it is determined that monochromatic print processing is to be performed), the flow advances to step S9. In step S9, the print data stored in the page buffer is sent to the print server 20 of the network to cause the printer (LBP 21) connected to the print server 20 to print.

The flow advances to step S10 to determine whether replacement page print processing is set to be performed by the color printer. If YES in step S10, the flow advances to step S11 to send replacement data to the color printer (print server 20 in this embodiment).

If it is determined in step S8 that the color flag is ON, the flow advances to step S12 to send the print data in the page buffer to the color printer. In step S13, it is determined whether replacement page print processing is set to be performed by the monochromatic printer. If YES in step S13, the flow advances to step S14 to send replacement data to the monochromatic printer (local printer 11a in this embodiment).

Upon completion of printing of one page, the flow advances to step S15 to determine whether printing of all pages is complete. If NO in step S15, the processing from step S2 is repeated to print the next page.

In the above processing, when the replacement page is to be printed by the color printer, and monochromatic print data of five pages are continuously printed by the monochromatic printer, five replacement pages corresponding in number to the monochromatic pages are printed. If confirmation suffices, a message (character string) indicating insertion of five pages may be recorded on one recording paper sheet.

To realize this processing, processing of counting the number of pages is performed in step S11 during printing of monochromatic pages without actually printing replacement pages.

Immediately before step S12, when the count result is not "0", data with a message indicating replacement of the number of pages represented by the count value is sent to the color printer and recorded on a recording paper sheet. The count value is reset to "0".

Similarly, in step S14, instead of sending the print data, the count operation is performed. Immediately before step S9, data with a message indicating replacement of pages corresponding in number to the count value is printed, and the count value is reset to "0".

Figure 11:
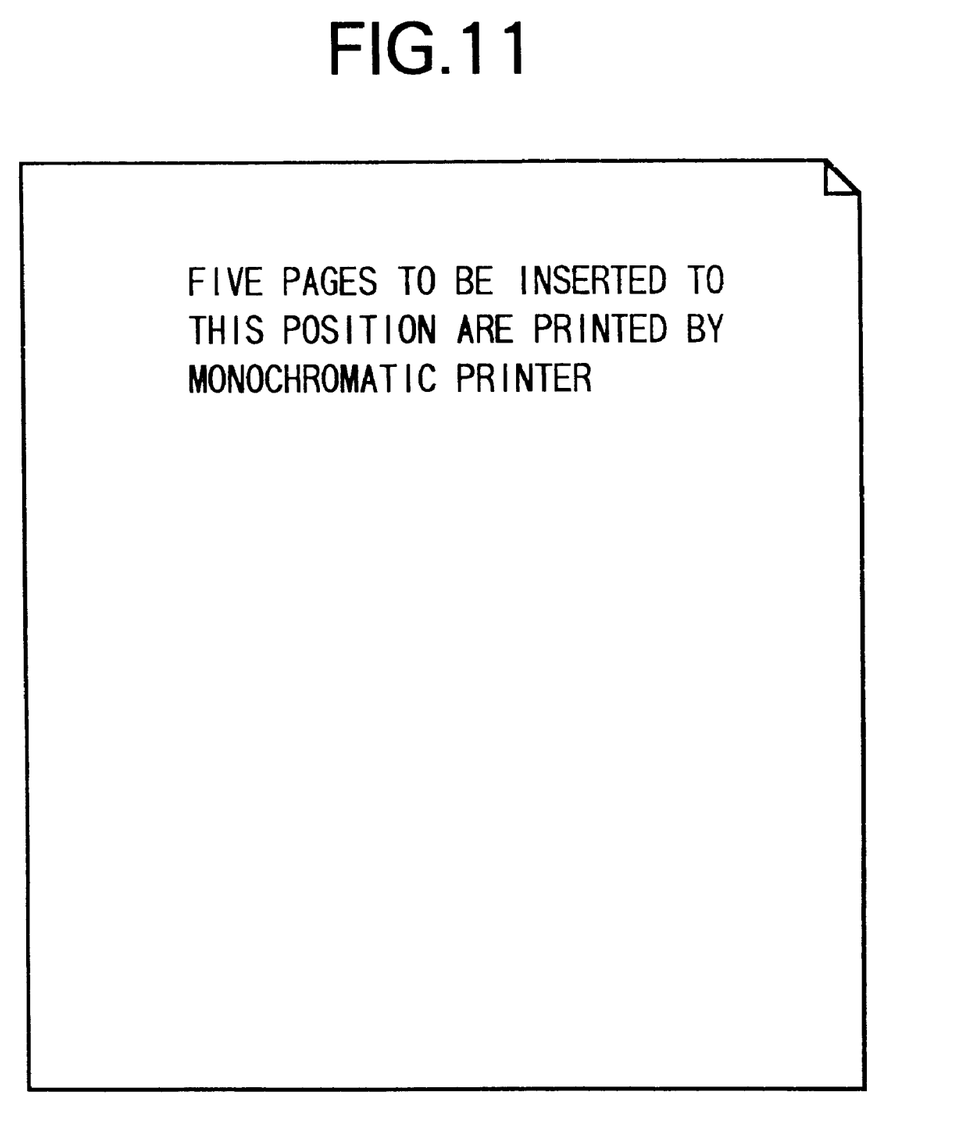
FIG. 11 is a view showing an output example of a replacement page in a modification of the first embodiment.

As a result, a page as shown in FIG. 11 is printed.

With the above processing, even when a plurality of continuous pages must be replaced, an indication of replacement is recorded on one recording paper sheet. Therefore, the resources can be effectively utilized.

In the above embodiment, when a replacement page is to be printed, an appropriate message is printed. However, the present invention is not limited to this.

For example, in step S11, the print data stored in the page buffer may be output to the color printer. Similarly, in step S14, print data except information (e.g., a command) associated with color control in the print data stored in the page buffer may be printed by the monochromatic printer.

If only the third and fifth pages of ten pages are color pages, and replacement pages are to be printed by the monochromatic printer, the first to tenth pages, i.e., all pages are printed by the monochromatic printer, and only the third and fifth pages which are to be originally printed in color are printed by the color printer.

This processing copes with a case in which an original document containing monochromatic and color pages is to be copied by a monochromatic copying machine to prepare a plurality of copies. Generally, when a color original and a monochromatic original are read and copied by the monochromatic copying machine, the copy result of the color original becomes inconveniently lighter than that of the monochromatic original.

The above modification of the first embodiment may be appropriately applied to other embodiments to be described later, as a matter of course.

In the above embodiment, one of the two printers is a local color printer connected to the client, and the other is a monochromatic LBP on the network. If the apparatus itself has two interfaces, a high-speed monochromatic printer and a slower color printer may be connected to the interfaces, respectively. This arrangement can cope with use as a stand-alone apparatus. Generally, a personal computer has a parallel interface and a serial interface. Recent printers also have these interfaces or optionally have the interfaces. Therefore, the same interface is not always necessary.

In the above description, the printer on the network is connected to the printer interface of the print server. However, a printer directly connectable to the network need not have the arrangement shown in FIG. 2.

Second Embodiment

In the above embodiment (first embodiment), the monochromatic printer and the color printer interpret the same printer language for print processing.

Today, a printer can interpret the printer language used before. However, the printer language is basically bound to expand, and the printer may not be able to exhibit its original performance when it must work as the greatest common divisor among different internal languages, even in printers of the same manufacturer. This is more so for different languages of different manufacturers.

In the second embodiment, even when using a different printer language, the same processing as that of the first embodiment can be performed.

Assume that a color printer as a local printer is assigned to port LPT1 of the apparatus, and a printer LBP as a network server 20 is assigned to LPT2. These printers use different languages. The color printer originally uses a printer driver "DRIVER_A" to prepare and output print data. The monochromatic printer uses a printer driver "DRIVER_B" to prepare and output print data. That is, an external storage unit 4 of the apparatus stores the two drivers in advance. In the second embodiment, a virtual driver is prepared to switch these two printer drivers so that the printer drivers are switched in units of pages.

Figure 7:
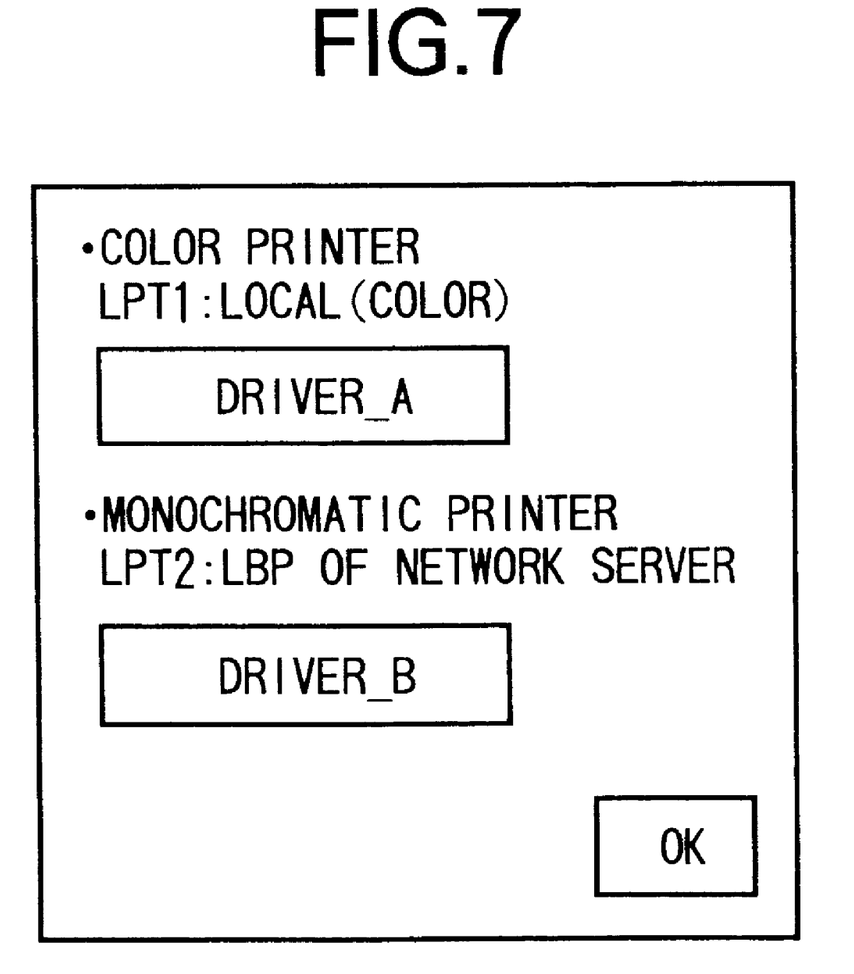
FIG. 7 is a view showing the setting screen of a printer driver of the second embodiment.

FIG. 7 shows an example of the setting window of the virtual printer driver of the second embodiment.

As shown in FIG. 7, the local printer is assigned to port LTP1, and the actual driver name "DRIVER_A" used by the local printer is set to LTP1. The network driver LBP is assigned to LTP2, and the driver name "DRIVER_B" is set to LTP2.

By operating the OK button by an input unit 5 or the like, the set contents of this virtual driver are stored in the environment file.

When a printing instruction is actually issued, the virtual driver starts and receives data in units of pages. The virtual driver determines whether the data contains information associated with color. If information associated with color is present, the "DRIVER_A" set as the color printer is started, and data of one page is transferred to the driver. If no information associated with color is present, the "DRIVER_B" is started, and data of one page is transferred to the driver.

More specifically, in the second embodiment, in registration of the virtual printer driver, the virtual printer driver is registered as a printer driver for the color printer. If MS-WINDOWS of Microsoft Corporation is used as the OS, metafile data is transferred from the application or OS upon receiving a printing instruction. Upon receiving this data, it is determined in units of pages whether monochromatic print processing is to be performed. If a color page is determined, the original printer driver (DRIVER_A in this embodiment) of the color printer is started. The virtual printer driver of this embodiment transfers the metafile data to the color printer driver as if the printer driver were an application or OS.

If a monochromatic page is determined, the received metafile data is transferred to the printer driver "DRIVER_B".

Subsequently, the respective drivers perform processing. Processing of transferring the metafile data to each driver may be performed in steps S9 and S12 of FIG. 4.

With this arrangement, printers of different manufacturers can be connected to the apparatus, and the printer functions only by registering drivers provided by the manufacturers to the virtual driver. That is, printers can have different page languages.

When a replacement page is to be printed, metafile data for printing the replacement page may be prepared in the virtual driver and transferred to a corresponding printer driver. This processing may be performed in steps S11 and S14.

Third Embodiment

In the above embodiments, processing on the print data sending side has been mainly described. However, this processing may be performed on the printer side.

This will be described below with reference to FIGS. 8 and 9 as the third embodiment.

Figure 8:
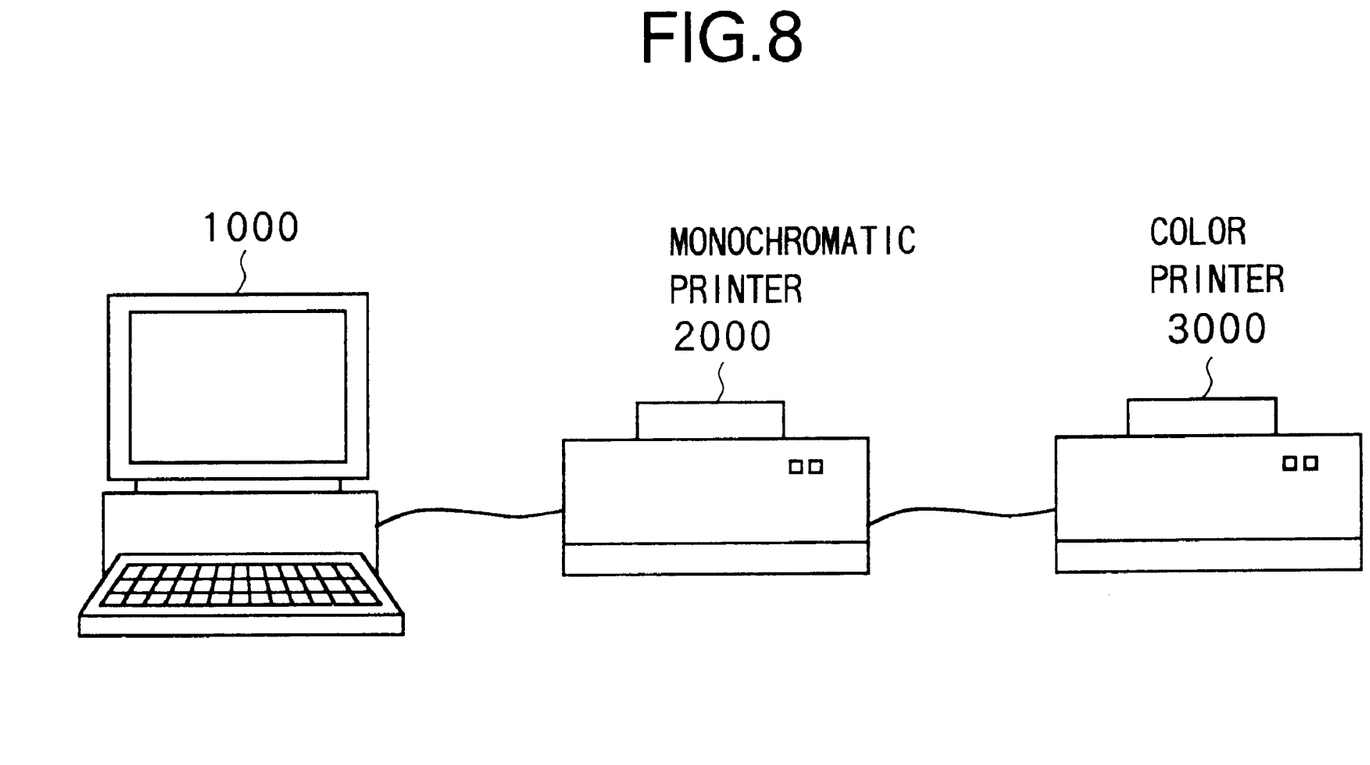
FIG. 8 is a view showing a system configuration according to the third embodiment.

FIG. 8 shows the connection between a host computer and two printers. In FIG. 8, at least the monochromatic printer has the arrangement shown in FIG. 9. This arrangement will be described below.

Figure 9:
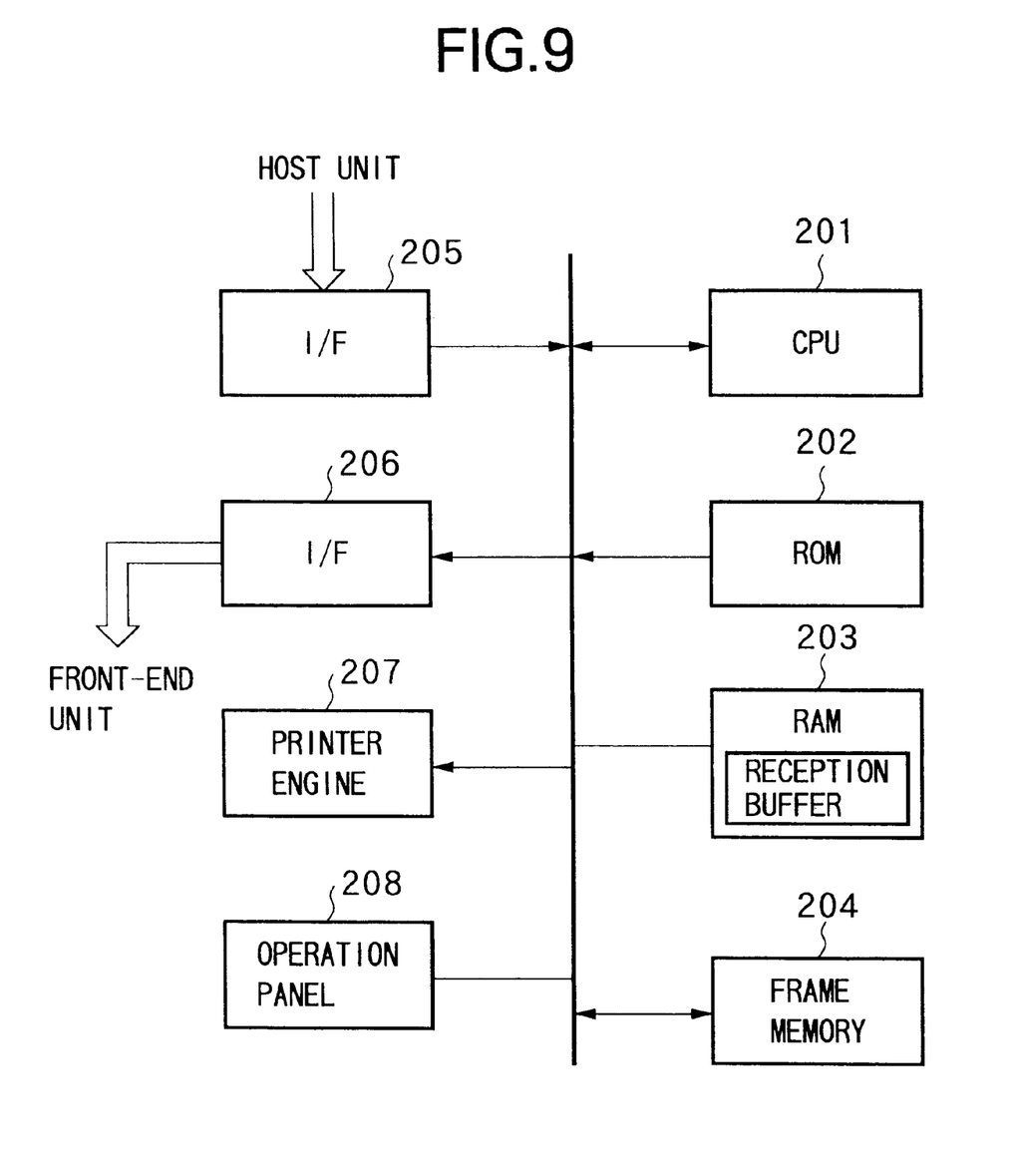
FIG. 9 is a block diagram of a printer 2000 of the third embodiment.

In FIG. 9, reference numeral 201 denotes a CPU for controlling the entire operation of the printer 2000 as shown in FIG. 8; 202, a ROM which stores operation procedures of the CPU 201 and various font data; 203, a RAM used as the work area of the CPU and including a reception buffer; 204, a frame memory capable of developing image data of one page or one band; 205, an interface for receiving print data from a host unit (host computer 1000 in FIG. 8); 206, an interface for sending print data to a front-end printer; 207, a printer engine for actually performing print processing (having almost the same arrangement as in FIG. 6); and 208, an operation panel.

The arrangement from the CPU 201 to the interface 206 corresponds to the printer control unit shown in FIG. 6.

In the above arrangement, print data is sent from the host computer 1000 and temporarily stored in the reception buffer. If data of one page of the print data contains no information associated with color, the image data is developed in the frame memory 204 and output to the printer engine 207, thereby performing print processing.

If a page including information of color (other than black and white) is detected, the print data of this page is output to a front-end color printer 3000.

Consequently, the host computer 1000 only needs to perform normal print processing, and processing described in the first embodiment is unnecessary.

In addition, since only one interface suffices for the host computer 1000, no special card needs to be mounted.

In the third embodiment, replacement page print processing may be performed. Processing for replacement of continuous pages as in the modification of the first embodiment may be performed.

Fourth Embodiment

In the first to third embodiments, distributed print processing by two printers is performed paying attention to the characteristics of the printers, i.e., color or monochromatic.

Some printers (especially page printers) can have a plurality of paper trays and select a paper sheet designated by the host computer for print processing.

However, many printers have only one paper tray (or cannot have two or more trays).

Distributed print processing may be performed using two or more printers each having a number of paper trays or paper sheets loaded.

More specifically, the page size for print processing is detected in units of pages as in the above embodiments, and the detected page size is sent to a printer having corresponding paper sheets. For a replacement page, if the print data is larger than the paper size, reduction printing is performed. Otherwise, printing is performed in the same size.

The present invention can also be applied to three or more printers.

As has been described above, according to this embodiment, the print control method comprises the steps of designating whether a replacement page is to be inserted to complete the pages of a document which is to be distributed and printed and, when replacement page insertion is set, designating a printing device for printing the replacement page to be inserted, determining on the basis of the characteristics of print data and printing devices a printing device for printing the print data in units of pages, printing the print data by the printing device in accordance with the determination result, and inserting the replacement page to the designated printing device when replacement page insertion is designated. With this method, print processing is performed by a printing device having a characteristic suitable for the print data so that unnecessary print processing can be minimized. In addition, since replacement pages are inserted, the divided and printed document can be easily sorted. When output data contains a page number, and the order of the pages is obvious without inserting replacement pages, replacement page insertion can be disabled.

A combination of a low-speed printer which prints less frequently and a high-speed printer which prints more frequently increases the throughput of printing.

When print processing is performed in a remote place via, e.g., a WAN, and the original cannot be referred to, divided printing without replacement page insertion does not permit sorting of printouts in some cases. In the present invention, the printouts can be sorted without referring to the original because replacement pages are inserted.

In the above embodiments, one of the two printers is connected to a network, and the other is directly connected to the apparatus. However, both printers may be directly connected to the apparatus or connected to a network, as a matter of course.

The present invention can be applied to a system constituted by a plurality of devices (e.g., a host computer, an interface device, a reader, and a printer), or to an apparatus comprising a single device.

In addition, the object of the invention can be attained by supplying, to a system or apparatus, a storage medium in which a program code of software for realizing the function of the above-described embodiment is recorded, reading out the program code stored in the storage medium by the computer (or a CPU or MPU) of the system or apparatus, and executing the program code, as a matter of course.

In this case, the program code itself which is read out from the storage medium realizes the function of the above-described embodiments, and the storage medium which stores the program code constitutes the present invention.

As the recording medium for supplying a program code, a floppy disk, a hard disk, an optical disk, a magnetooptical disk, a CD-ROM, a CD-R, a magnetic tape, a nonvolatile memory card, or a ROM can be used.

The present invention incorporates not only a case in which the computer executes the readout program code to realize the function of the above-described embodiments but also a case in which an OS (Operating System) running on the computer performs part or all of the actual processing to realize the function of the above-described embodiments with the processing, as a matter of course.

The present invention also incorporates a case in which the program code read out from the storage medium is written in a memory of a feature expansion board inserted in the computer or a feature expansion unit connected to the computer, and thereafter, a CPU of the feature expansion board or feature expansion unit performs part or all of the actual processing to realize the function of the above-described embodiments with the processing, as a matter of course.

Figure 10:
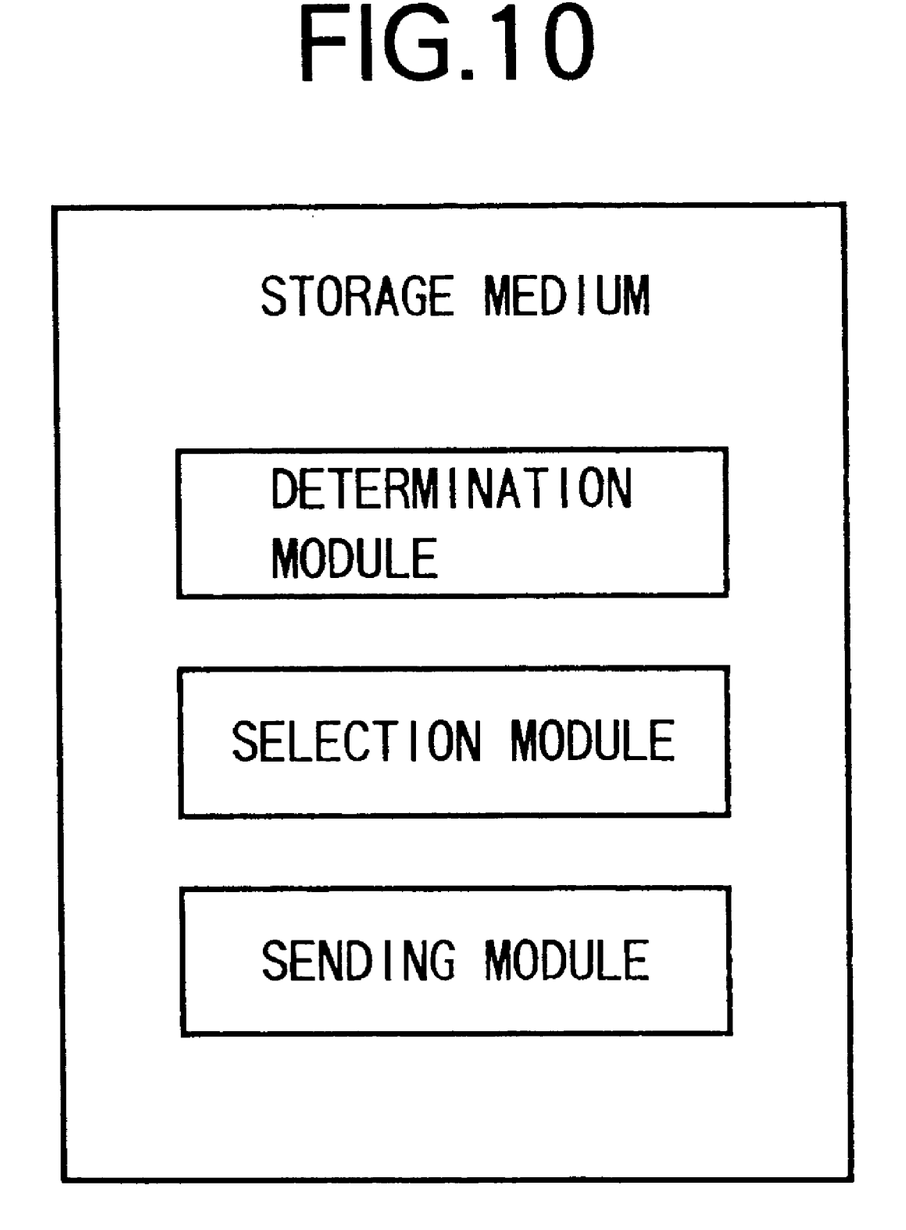
FIG. 10 is a view showing a memory map on a storage medium for realizing the first embodiment.

When the above storage medium is to be applied to the first embodiment, the storage medium stores a program code corresponding to the above-described flow chart. That is, each module shown in the memory map of FIG. 10 is stored in the storage medium.

More specifically, the program code may comprise a determination module for receiving data to be printed from host processing and determining the characteristics of the data in units of pages, a selection module for selecting one of a plurality of printing devices in accordance with the determination result, and a sending module for sending data of one page determined by the determination step to the selected printing device.

As has been described above, according to the present invention, an optimum printing device can be automatically selected in units of pages in accordance with the characteristics of the page to print the page. Therefore, the load on the operator in print processing can be reduced.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus as a host unit for generating print data to be printed and for performing distributed printing by outputting the print data to a plurality of printing devices having different printing characteristics, each of the plurality of printing devices performing printing independently, said apparatus comprising:

determination means for receiving data to be printed from an application via an operating system and determining color characteristics of the data in units of pages by analyzing the data;

selection means for selecting a printing device for printing the data of a page out of the plurality of printing devices in accordance with a determination result from said determination means; and control means for generating the print data in a printer language which is able to be interpreted by the selected printing device based on the data received from the application and controlling outputting of the print data of the page so as to be outputted to the printing device selected by said selection means.

2. The apparatus according to claim 1, further comprising:

first setting means for setting whether a replacement page is to be inserted; and second setting means for setting a printing device for printing the replacement page, wherein said control means, when insertion of the replacement page is instructed by said first setting means, controls operation such that the data of the replacement page is outputted to the printing device set by said second setting means.

3. The apparatus according to claim 2, wherein said control means adaptively outputs the print data of one page, which is sent to a printing device, which is not set by said second setting means, to the printing device set by said second setting means.

4. The apparatus according to claim 2, wherein said control means counts the number of pages continuously outputted to a printing device, which is not set by said second setting means, and outputs data corresponding to a count result to the printing device set by said second setting means.

5. The apparatus according to claim 1, wherein the printing characteristics represent whether the printing devices are capable of color printing, said determination means determines whether the data in units of pages contains information associated with color, and said selection means selects color printing when the information associated with color is present and monochromatic printing when no color information is present.

6. The apparatus according to claim 1, wherein one of the printing characteristics is a size characteristic of a recording medium, said determination means determines a recording medium size designated in units of pages, and said selection means selects a printing device in accordance with the medium size.

7. The apparatus according to claim 1, wherein said control means comprises conversion means for converting the data of the page determined by said determination means into data of a format adaptive to the printing device selected by said selection means.

8. A printing control method of an information processing apparatus as a host unit for generating print data to be printed and for performing distributed printing by outputting the print data to a plurality of printing devices having different printing characteristics, each of the plurality of printing devices performing printing independently, said method comprising:

a determination step of receiving data to be printed from an application via an operating system and determining color characteristics of the data in units of pages by analyzing the data;

a selection step of selecting a printing device for printing the data of a page out of the plurality of printing devices in accordance with a determination result in said determination step; and a control step of generating the print data in a printer language which is able to be interpreted by the selected printing device based on the data received from the application and controlling outputting of the print data of the page so as to be outputted to the printing device selected in said selection step.

9. The method according to claim 8, further comprising:

a first setting step of setting whether a replacement page is to be inserted; and a second setting step of setting a printing device for printing the replacement page, wherein said control step comprises, when insertion of the replacement page is instructed in said first setting step, controlling operation such that the data of the replacement page is output to the printing device set in said second setting step.

10. The method according to claim 9, wherein said control step comprises adaptively outputting the print data of one page, which is sent to a printing device, which is not set in said second setting step, to the printing device set in said second setting step.

11. The method according to claim 9, wherein said control step comprises counting the number of pages continuously output to a printing device, which is not set in said second setting step, and outputting data corresponding to a count result to the printing device set in said second setting step.

12. The method according to claim 8, wherein the printing characteristics represent whether the printing devices are capable of color printing, said determination step comprises determining whether the data in units of pages contains information associated with color, and said selection step comprises selecting color printing when the information associated with color is present and monochromatic printing when no color information is present.

13. The method according to claim 8, wherein one of the printing characteristics is a size characteristic of a recording medium, said determination step comprises determining a recording medium size designated in units of pages, and said selection step comprises selecting the printing device in accordance with the medium size.

14. The method according to claim 8, wherein said control step comprises a conversion step of converting the data of the page determined in said determination step into data of a format adaptive to the printing device selected in said selection step.

15. A storage medium from which data is read into a memory of an information processing apparatus as a host unit and executed to perform distributed printing by outputting print data to be printed to a plurality of printing devices having different printing characteristics, each of the plurality of printing devices performing printing independently, said medium comprising:

a procedure code of a determination step of receiving data to be printed from an application via an operating system and determining color characteristics of the data in units of pages by analyzing the data;

a procedure code of a selection step of selecting a printing device for printing the data of a page out of the plurality of printing devices in accordance with a determination result in the determination step; and a procedure code of a control step of generating the print data in a printer language which is able to be interpreted by the selected printing device based on the data received from the application and controlling outputting of the print data of the page so as to be outputted to the printing device selected in the selection step.

16. The storage medium according to claim 15, further comprising:

a procedure code for a first setting step for setting whether a replacement page is to be inserted; and a procedure code for a second setting step for setting a printing device for printing the replacement page, wherein the procedure code for the control step, when insertion of the replacement page is instructed by the procedure code for the first setting step, controls operation such that the data of the replacement page is outputted to the printing device set by the procedure code for the second setting step.

17. The storage medium according to claim 16, wherein the procedure code for the control step adaptively outputs the print data of one page, which is sent to a printing device, which is not set by the procedure code for the second setting step, to the printing device set by the procedure code for the second setting step.

18. The storage medium according to claim 16, wherein the procedure code for the control step counts the number of pages continuously outputted to a printing device, which is not set by the procedure code for the second setting step, and outputs data corresponding to a count result to the printing device set by the procedure code for the second setting step.

19. The storage medium according to claim 15, wherein the printing characteristics represent whether the printing devices are capable of color printing, the procedure code for the determination step determines whether the data in units of pages contains information associated with color, and the procedure code for the selection step selects color printing when the information associated with color is present and monochromatic printing when no color information is present.

20. The storage medium according to claim 15, wherein one of the printing characteristics is a size characteristic of a recording medium, the procedure code for the determination step determines a recording medium size designated in units of pages, and the procedure code for the selection step selects a printing device in accordance with the medium size.

21. The storage medium according to claim 15, wherein the procedure code of the control step includes a procedure code for a conversion step of converting the data of the page determined in the determination step into data of a format adaptive to the printing device selected in the selection step.

* * * * *